(12) United States Patent
Schoenherr

(10) Patent No.: US 9,625,578 B2
(45) Date of Patent: Apr. 18, 2017

(54) INTERFERENCE SUPPRESSION IN BLIND SPOT MONITORING

(71) Applicant: Robert Bosch GmbH, Stuttgart (DE)

(72) Inventor: Michael Schoenherr, Renningen-Malmsheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/216,314

(22) Filed: Mar. 17, 2014

(65) Prior Publication Data

US 2014/0288814 A1   Sep. 25, 2014

(30) Foreign Application Priority Data

Mar. 22, 2013 (DE) .................. 10 2013 205 167

(51) Int. Cl.

| | |
|---|---|
| *G01S 15/93* | (2006.01) |
| *G01S 15/87* | (2006.01) |
| *G01S 13/93* | (2006.01) |
| *B60W 50/14* | (2012.01) |
| *B60W 30/095* | (2012.01) |
| *B60W 30/18* | (2012.01) |

(52) U.S. Cl.
CPC .......... *G01S 15/931* (2013.01); *G01S 15/878* (2013.01); *B60W 30/095* (2013.01); *B60W 30/18163* (2013.01); *B60W 50/14* (2013.01); *B60W 2420/54* (2013.01); *G01S 2013/9332* (2013.01); *G01S 2015/938* (2013.01)

(58) Field of Classification Search
None
See application file for complete search history.

(56) References Cited

U.S. PATENT DOCUMENTS

| | | | |
|---|---|---|---|
| 7,557,692 B2* | 7/2009 | Li | G01S 15/931 340/425.5 |
| 2002/0005778 A1* | 1/2002 | Breed | B60Q 9/008 340/435 |
| 2006/0287828 A1* | 12/2006 | Lehner | 701/301 |
| 2009/0210157 A1* | 8/2009 | Lee | 701/301 |
| 2010/0067324 A1* | 3/2010 | Preissler | G01S 7/52004 367/13 |
| 2012/0120768 A1* | 5/2012 | Horsky | G01S 7/536 367/93 |
| 2012/0191298 A1* | 7/2012 | Schwarzhaupt et al. | 701/36 |
| 2013/0142011 A1* | 6/2013 | Hallek | G01S 7/527 367/87 |
| 2014/0376333 A1* | 12/2014 | Larson | G01S 7/521 367/99 |

(Continued)

FOREIGN PATENT DOCUMENTS

| | | |
|---|---|---|
| DE | 10 2005 027 653 | 12/2006 |
| DE | 10 2006 003 489 | 7/2007 |

(Continued)

*Primary Examiner* — Rami Khatib
*Assistant Examiner* — Jeffrey Boomer
(74) *Attorney, Agent, or Firm* — Gerard Messina

(57) ABSTRACT

A device for detecting a moving object in a blind spot includes: at least one first ultrasonic sensor of a side view assist system; and a control unit for determining the distance and/or speed and/or position of the moving object. The control unit processes at least one signal of a second ultrasonic sensor of a driving assistance system for monitoring the blind spot.

4 Claims, 2 Drawing Sheets

(56) References Cited

U.S. PATENT DOCUMENTS

2015/0092518 A1* 4/2015 Kim ..................... G01S 7/527
367/87

FOREIGN PATENT DOCUMENTS

| DE | 10 2006 037 591 | 2/2008 | | |
| DE | 10 2009 041 557 | 6/2010 | | |
| DE | 10 2009 040 295 | 3/2011 | | |
| DE | 10 2010 051 486 | 2/2012 | | |
| DE | WO 2012016834 A1 * | 2/2012 | ............. | G01S 7/023 |
| TW | GB 2431992 A * | 5/2007 | ......... | G01S 7/52001 |

* cited by examiner

INTERFERENCE SUPPRESSION IN BLIND SPOT MONITORING

BACKGROUND OF THE INVENTION

1. Field of the Invention

The present invention relates to a device and a method for detecting an approaching vehicle in a blind spot.

2. Description of the Related Art

There has been increasing use of assistance systems in modern automotive engineering; in particular, blind spot monitoring systems (side view assist, SVA) are known. These side view assist systems are capable of supporting the driver of a vehicle in a lane change or in backing out of a parking space. These systems are therefore capable of recognizing approaching vehicles and/or obstacles in a blind spot range. The driver of a vehicle equipped with such a side view assist system is then warned when an object is detected in the blind spot range. Side view assist systems have sensor systems for detecting other vehicles in a side lane and obstacles in the blind spot, these sensor systems generally being equipped with ultrasonic sensors.

One such system is known, for example, from published German patent application document DE 10 2006 037 591 A1, which has four ultrasonic sensors (so-called SVA ultrasonic sensors, where SVA stands for "side view assist") mounted on the side of the vehicle for detecting a moving object in a blind spot. These ultrasonic sensors function as transceiver units. These so-called SVA ultrasonic sensors emit a query signal to search for objects in the blind spot. If an object is located in the blind spot, the query signal is reflected by the object and at least partially sent back to the same sensor. However, false warnings and errors may occur when one vehicle equipped with a side view assist system passes another vehicle also equipped with a side view assist system. The reason for the false warning is that the SVA ultrasonic sensors are unable to differentiate whether they are detecting the reflection of their own transmitted pulse from the query signal or a signal from a different ultrasonic source. This happens in particular since the query signals are not usually encoded by the corresponding vehicles and thus cannot be differentiated from one another.

BRIEF SUMMARY OF THE INVENTION

The object of the present invention is therefore to overcome the disadvantages described above and to provide a device and a method which will make it possible to reliably detect approaching vehicles and stationary objects in a blind spot and to more reliably prevent false warnings and/or errors.

Features and details described in conjunction with the device according to the present invention are of course also applicable in conjunction with the method according to the present invention and in conjunction with the vehicle according to the present invention and vice versa, so that with respect to the disclosure of the individual aspects according to the present invention, reference is or may always be made mutually to the individual aspects of the present invention.

The object according to the present invention is achieved by a device having at least one first ultrasonic sensor of a side view assist system (SVA ultrasonic sensor) for detecting an object, in particular an approaching vehicle in a blind spot and a control unit for determining the distance and/or speed and/or position of the object. It is provided here according to the present invention that the control unit is designed in such a way that at least one signal of a second ultrasonic sensor, which is not part of the SVA system but instead is part of an additional sensor system provided on the vehicle such as, for example, a parking assist system (so-called park pilot ultrasonic sensor, hereinafter also referred to as a PP ultrasonic sensor). The present invention is directed to the idea that in addition to the first (SVA) ultrasonic sensor of the actual SVA system, at least one additional, second (PP) ultrasonic sensor of the driving assistance system may be additionally be queried in and by the same vehicle after detection in the blind spot. The additional query of at least one additional, second (PP) ultrasonic sensor in the host vehicle may advantageously function to verify whether the signal received by the first ultrasonic sensor is the reflection of its own signal or a signal from another outside ultrasonic source. In one advantageous embodiment of the present invention, multiple second ultrasonic sensors may be queried. The device according to the present invention may then be activated if the driver indicates his intention to change lanes, for example, by setting the turn indicator or by steering the vehicle. The second ultrasonic sensors may be activated in the energy saving listening and receiving mode. The ultrasonic signals are not sent out by the additional second ultrasonic sensors of the driving assistance systems but they are received. The additional ultrasonic sensors of the driving assistance system may be an integral part of the device according to the present invention. Alternatively, the control unit may be designed to receive and/or analyze signals from sensors of other systems in the host vehicle. The query of at least one additional second ultrasonic sensor advantageously makes it possible to determine whether the detection actually involves an object in the blind spot to prevent a false warning.

Within the context of the present invention, the device may have a side assist system having at least one first ultrasonic sensor (SVA ultrasonic sensor) and a driving assistance system having at least one second ultrasonic sensor (PP ultrasonic sensor). It is advantageous here that the device according to the present invention is able to include and control the functions of both systems. Furthermore the device may use the second ultrasonic sensors of the driving assistance system as needed and may utilize the option of assisted driving or parking or for observing the side view. It is advantageous in particular that the two functions may be implemented with PP ultrasonic sensors already present in the vehicle. It is therefore unnecessary to have additional sensors. For monitoring the blind spot, the second ultrasonic sensors are used only when driving above a certain minimum speed. For assisted parking, however, the PP ultrasonic sensors are activated when the speed drops below a speed below the minimum speed. The second ultrasonic sensors are therefore not used for the two functions at the same time. It is therefore possible to reduce not only sensors but also installation space and costs in installing the two systems. Furthermore, the functionality of the side view assist system may be greatly improved by using PP ultrasonic sensors.

In addition, it may be provided within the scope of the present invention that the side view assist system has four first (SVA) ultrasonic sensors. Furthermore, the driving assistance system may also have four second (PP) ultrasonic sensors. The four first ultrasonic sensors may be arranged on each of the outer corners of the vehicle at the side on or behind the vehicle body. The four second ultrasonic sensors may be mounted at the front and/or rear of the vehicle, preferably in a row, preferably between two SVA ultrasonic sensors at the side in particular.

The first ultrasonic sensors of the side view assist system according to the present invention may have a detection range extending laterally with respect to the motor vehicle. For example, the first ultrasonic sensors may have a detection range oriented by 45° to the longitudinal direction of the vehicle and propagating in the form of a cone. In addition, the second ultrasonic sensors of the driving assistance system may have a detection range extending behind and/or in front of the motor vehicle. The second ultrasonic sensors and two neighboring first (SVA) ultrasonic sensors may advantageously have a detection range, which overlaps at least in part, so that the second ultrasonic sensors may also be used for monitoring the blind spot. The second ultrasonic sensors may thus be used to verify and carry out a plausibility check on a signal from a neighboring first ultrasonic sensor.

In a particularly advantageous embodiment of the present invention, the control unit may be connected to the side view assist system and/or the driving assistance system via a data link. It is also conceivable for the control unit to be able to communicate directly with the first and/or second ultrasonic sensors. Standardized data lines such as LIN-/CAN-BUS may be used for this purpose. Alternatively, the data link may also be wireless via electromagnetic waves or by radio. The control unit according to the present invention may be designed as a shared control unit for both systems or may include a specially designed control unit module for each system, which is able to communicate with the other control unit. It may be advantageous here that the control unit is able to take over the triggering of the second ultrasonic sensors only relative to the blind spot. In this regard, the control unit according to the present invention is able to communicate directly with the second ultrasonic sensors or with the driving assistance system.

The device according to the present invention may advantageously have means for generating a visual and/or acoustic warning signal. If an object has been detected in the blind spot, the means may generate an acoustic signal or activate a visual display on the dashboard or in the respective exterior mirror. Furthermore, it may be provided that the device is able to classify the approaching danger and adjust the warning signal depending on the position and/or speed of the detected object. Variable loudness of the acoustic signal or variable color displays may be generated.

In addition, the object according to the present invention is achieved by a method for detecting an object, in particular an approaching vehicle in a blind spot with the aid of a side view assist system having at least one first (SVA) ultrasonic sensor and a driving assistance system having multiple second (PP) ultrasonic sensors. According to the present invention, the method includes the following steps:
 a) Emitting a query signal with the aid of the first ultrasonic sensor of the side view assist system,
 b) Receiving a response signal with the aid of the first ultrasonic sensor,
 c) Querying the second ultrasonic sensors of the driving assistance system,
 d) Verifying the response signal as an external ultrasonic signal when all second ultrasonic sensors of the driving assistance system are receiving a response signal,
 e) Verifying the response signal as an object in the blind spot when only one of the second ultrasonic sensors of the driving assistance system receives a response signal.

The method according to the present invention advantageously permits reliable detection of an external ultrasonic signal as well as a reflection of the ultrasonic signal of one of the first ultrasonic sensors of the host's side view assist system. The idea of the present invention is that an external ultrasonic signal generates a signal in all the rear second ultrasonic sensors of the driving assistance system. In contrast with that, a reflection of its own ultrasonic signal generates a signal only in the emitting first ultrasonic sensor and the neighboring second ultrasonic sensor but not in all the other second ultrasonic sensors. The vehicle's own first ultrasonic sensors are advantageously designed to scan a certain detection range at the sides and at the rear of the vehicle. A reflected ultrasonic signal is then reflected back in the direction toward the emitting first ultrasonic sensor, whereby a detection is only possible in a neighboring second ultrasonic sensor. For this reason, the present invention makes it possible to reliably recognize when detection in the respective first ultrasonic sensor in fact permits the conclusion that there is an object in the blind spot. The interfering false warnings may therefore be almost ruled out.

To initiate the method, step a) or c) may be carried out first. When the method begins with step a), a query signal may be sent out initially by the first ultrasonic sensor. The second ultrasonic sensors may be activated at the same time. Alternatively, the second ultrasonic sensors may be activated when the emitting first ultrasonic sensor receives a response signal. If the method begins with step c), the second ultrasonic sensors may be activated first, with the first ultrasonic sensors being activated at the same time or only when the second ultrasonic sensors have detected a signal. The steps according to the present invention may be carried out simultaneously, in succession or in an arbitrary sequence.

According to the present invention, it may be provided that the second ultrasonic sensors of the driving assistance system and/or the first ultrasonic sensors of the side view assist system are activated above a certain vehicle speed, for example, 18 km/h. The PP ultrasonic sensors of the driving assistance system may be activated in the receiving mode. Energy for operation of the device according to the present invention may therefore be saved.

A second particular advantage of the present invention is that it is possible to ascertain the position of the sensed object due to the transit time difference in the response signal to a first ultrasonic sensor and to a neighboring second ultrasonic sensor of the driving assistance system. The use of multiple first and/or second ultrasonic sensors permits an angle resolution and may also, in addition to the distance from the object, advantageously ascertain its position. The steps according to the present invention may advantageously be repeated. The emission of multiple query signals in succession may be used to determine the speed of the approaching object. Consequently, the method according to the present invention is able to ascertain very precisely the risk in a passing maneuver and to suppress false warnings.

The object according to the present invention may be achieved advantageously by a motor vehicle which is equipped with a device according to the present invention, which may be operated by a method according to the present invention. A particularly advantageous specific embodiment of the present invention is obtained when the device according to the present invention is designed as an integral part of the motor vehicle or as a component of the motor vehicle including a side view assist system having at least one first ultrasonic sensor and a driving assistance system having at least one second ultrasonic sensor. Furthermore, according to the present invention it may be provided that the device according to the present invention is designed as a module which may be installed in various vehicle models. Alternatively, the device according to the present invention may include only a side view assist system but be designed to communicate with other driving assistance systems in the host vehicle, so that existing driving assistance systems may be used.

According to the present invention, the features of the description and the claims of the device according to the present invention, the method according to the present invention and the vehicle according to the present invention may be essential to the present invention either individually by themselves or in a variety of combinations.

DETAILED DESCRIPTION OF THE INVENTION

Figure 1:
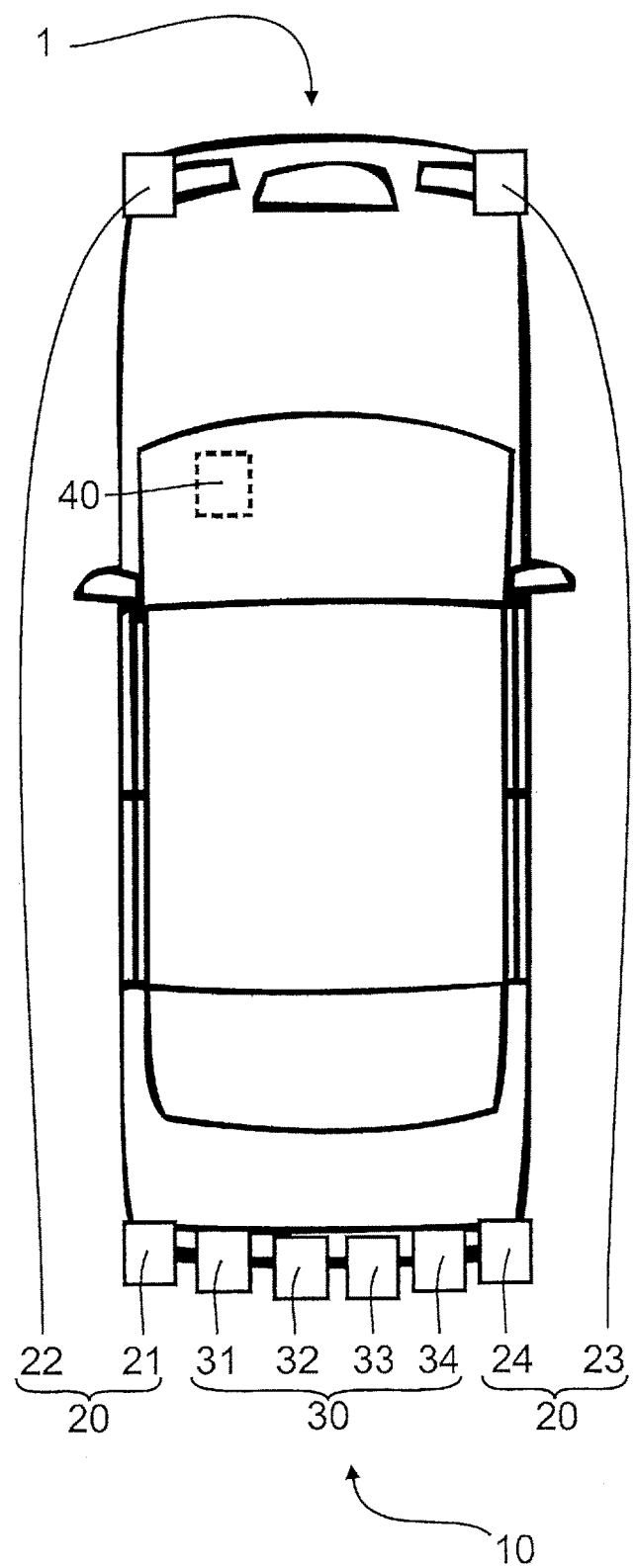
FIG. 1 schematically shows a vehicle according to the present invention.
Figure 2:
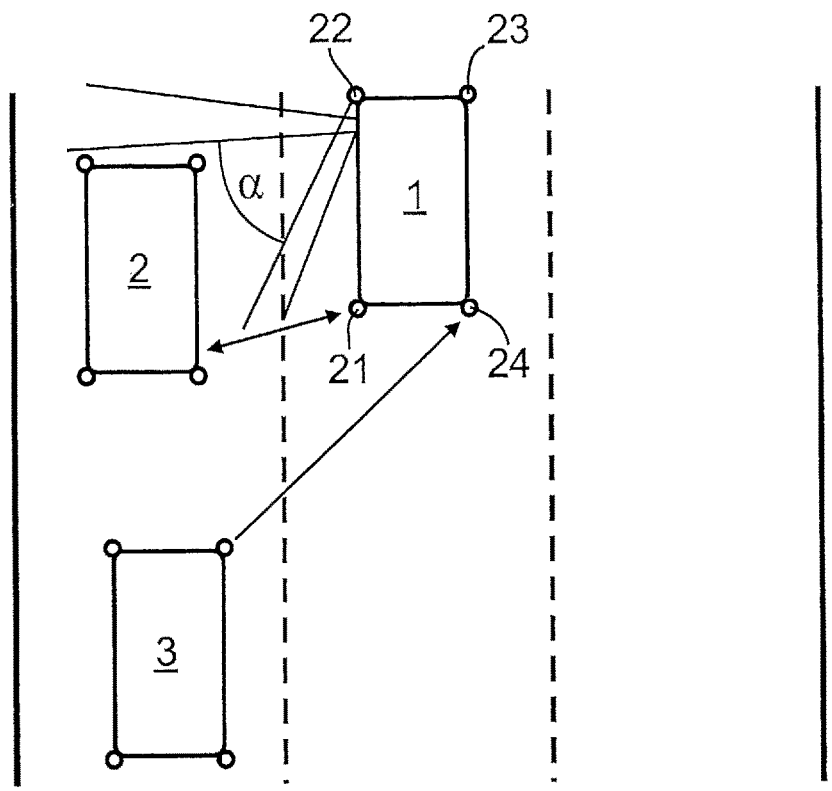
FIG. 2 schematically shows a conventional vehicle before a lane change to the left.
Figure 3:
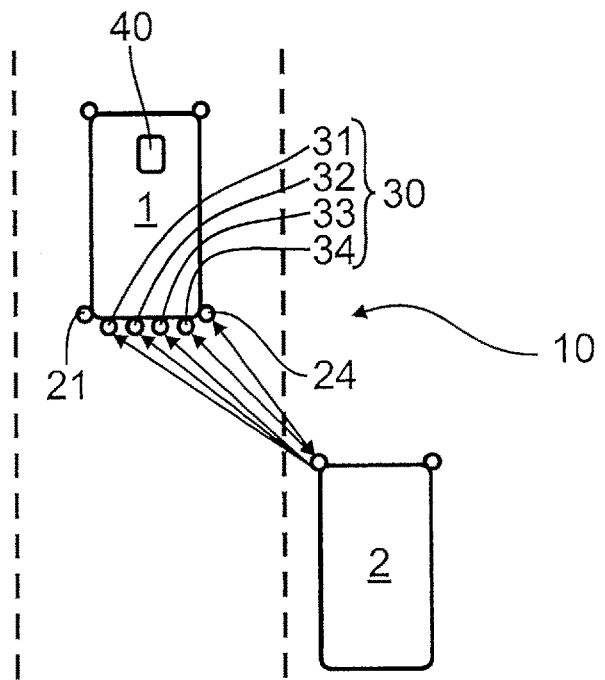
FIG. 3 schematically shows the vehicle according to the present invention before a lane change to the right.

Elements having the same function and mode of operation are labeled with the same reference numerals in FIGS. 1, 2 and 3.

FIG. 1 illustrates a vehicle 1 according to the present invention, which has a side view assist system 20 having four SVA ultrasonic sensors 21, 22, 23, 24 as the first ultrasonic sensors and a driving assistance system 30 having four additional PP ultrasonic sensors 31, 32, 33, 34 as the second ultrasonic sensors. Four SVA ultrasonic sensors 21, 22, 23, 24 are situated on the side of vehicle 1. Two SVA ultrasonic sensors 21, 24 are provided in the rear of vehicle 1 and two SVA ultrasonic sensors 22, 23 are provided on the front of vehicle 1. Four PP ultrasonic sensors 31, 32, 33, 34 are situated in the rear end of the vehicle in the exemplary embodiment of the present invention shown here. PP ultrasonic sensors 31, 32, 33, 34 are mounted in a row between two rear SVA ultrasonic sensors 21, 24.

SVA ultrasonic sensors 21, 22, 23, 24 of side view assist system 20 have a detection range extending laterally with respect to the motor vehicle, PP ultrasonic sensors 31, 32, 33, 34 of driving assistance system 30 having a detection range extending essentially behind motor vehicle 1. Sensors 21 through 24 and 31 through 34 according to the present invention have a data link to a control unit 40, shown schematically here. The data link between control unit 40 and side view assist system 20 as well as driving assistance system 30 is provided via a standardized data bus. Control unit 40 may be used according to the present invention for triggering both systems 20, 30. Alternatively, control unit 40 may be designed only for triggering side view assist system 20 and for communication with driving assistance system 30.

FIG. 2 shows a conventional vehicle 1 just before a passing maneuver using a known side view assist system which has only four SVA ultrasonic sensors 21, 22, 23, 24 mounted on the side of vehicle 1. SVA ultrasonic sensors 21, 22, 23, 24 are used as transceiver units. They emit a query signal to scan a blind spot α for approaching vehicles 2, 3 and to facilitate the impending passing maneuver for the driver. If an external vehicle 2 is in the blind spot at the left in front of vehicle 1, a query signal is reflected from external vehicle 2 and sent back to same SVA ultrasonic sensor 21. However, a false warning may occur on SVA ultrasonic sensor 24 on the right side if another external vehicle 3, which is also equipped with a side view assist system, is in the vicinity but not in the blind spot. This occurs because SVA ultrasonic sensors 21, 22, 23, 24 are unable to differentiate whether they are detecting the reflection of their own query signal or a signal from another ultrasonic source since query signals do not generally differ from one another.

FIG. 3 shows a schematic diagram of a device 10 according to the present invention, which overcomes the disadvantages shown on the basis of FIG. 2. The present invention provides that control unit 40 is designed in such a way that it communicates not only with SVA ultrasonic sensors 21, 22, 23, 24 as the first ultrasonic sensors but also with four additional PP ultrasonic sensors 31, 32, 33, 34 as the second ultrasonic sensors. The idea according to the present invention here is that ultrasonic PP sensors 31, 32, 33, 34, which are present, may also be used to monitor blind spot α. The additional query of PP ultrasonic sensors 31, 32, 33, 34 is used to verify whether the signal received by an SVA ultrasonic sensor 24 is the reflection of their own ultrasonic signal or a signal from another external vehicle 2 having an ultrasonic sensor. PP ultrasonic sensors 31, 32, 33, 34 may be activated here in energy-saving listening mode beyond a certain speed. Device 10 according to the present invention may also be activated whenever the driver indicates, for example, by setting the turn indicator or by steering the vehicle that a lane change is intended.

Additional second PP ultrasonic sensors 31, 32, 33, 34 of driving assistance system 30 may be an integral part of device 10 according to the present invention. Furthermore, it is conceivable for side view assist system 20 having SVA ultrasonic sensors 21, 22, 23, 24 and driving assistance system 30 having PP ultrasonic sensors 31, 32, 33, 34 to be an integral part of device 10 according to the present invention. Alternatively, control unit 40 may include only SVA ultrasonic sensors 21, 22, 23, 24 of side view assist system 20 and may also be designed to receive signals from PP ultrasonic sensors 31, 32, 33, 34 of additional driving assistance systems 30 of the host vehicle.

Device 10 may advantageously control the functions of both systems 20, 30. Device 10 may use PP ultrasonic sensors 31, 32, 33, 34 of driving assistance system 30 only as needed to monitor blind spot α. The functions of both systems 20, 30 do not collide here since PP ultrasonic sensors 31, 32, 33, 34 are used for monitoring blind spot α only in situations when no assisted parking is requested, so that the same PP ultrasonic sensors 31, 32, 33, 34 may be used for both systems 20, 30.

The method according to the present invention, as shown in FIG. 3, may be initiated by emitting a query signal of SVA ultrasonic sensor 24. In the event of reflection of its own query signal, a response signal is received by the same SVA ultrasonic sensor 24 and by only the neighboring PP ultrasonic sensor 34. In the event when all rear PP ultrasonic sensors 31, 32, 33, 34 receive a response signal, an external ultrasonic signal may be verified and a false warning suppressed. It is thus possible to ensure reliable detection of an external ultrasonic signal. It is therefore possible to avoid distracting false warnings.

According to one advantageous specific embodiment of the method according to the present invention, PP ultrasonic sensors 31, 32, 33, 34 may be activated only when emitting SVA ultrasonic sensor 24 has received a response signal. Alternatively, PP ultrasonic sensors 31, 32, 33, 34 may initially be queried, SVA ultrasonic sensors 21, 22, 23, 24 then being activated at the same time or only when PP ultrasonic sensors 31, 32, 33, 34 receive a signal. Various variants of the present invention are conceivable, and the method steps according to the present invention may be initiated simultaneously or in a different order.

When using multiple ultrasonic sensors 21 through 24 and 31 through 34, an angle resolution may be carried out so that not only the distance from the external vehicle and its speed are ascertainable but also its position may be ascertained. The method according to the present invention therefore makes it possible to ascertain very accurately the danger of a passing maneuver and to suppress false warnings.

All features and advantages derived from the claims, the description or the drawings, including design details and spatial configurations, may be essential to the present invention either alone or in a wide variety of combinations based on FIGS. 1 through 3 in particular.

What is claimed is:

1. A device for detecting a moving object in a blind spot of a host vehicle, comprising:
    at least one side view ultrasonic sensor for detecting a moving object in the blind spot;
    at least one driving assistance ultrasonic sensor for monitoring at least one of distance, speed, and position of the moving object in the blind spot, wherein
        the at least one driving assistance ultrasonic sensor is configured to only receive signals when the at least one side view ultrasonic sensor is active; and
        the at least one driving assistance ultrasonic sensor is positioned on the host vehicle such that its detection range does not completely overlap with that of the at least one side view ultrasonic sensor;
    a control unit, connected to the at least one side view ultrasonic sensor and the at least one driving assistance ultrasonic sensor, configured to:
        determine which of the at least one driving assistance ultrasonic sensors is receiving a signal when the at least one side view ultrasonic sensor is active; and
        determine whether the at least one side view ultrasonic sensor is detecting a reflection of its own transmitted pulse or a signal from an external ultrasonic source based on which of the at least one driving assistance ultrasonic sensors is also receiving the signal.

2. The device as recited in claim 1, comprising at least four side view ultrasonic sensors and at least four driving assistance ultrasonic sensors.

3. The device as recited in claim 2, wherein the at least four driving assistance ultrasonic sensors are situated between at least two side view ultrasonic sensors on the host vehicle.

4. The device as recited in claim 2, wherein the at least four side view ultrasonic sensors have a detection range extending laterally with respect to the host vehicle, and wherein the at least four driving assistance ultrasonic sensors have a detection range extending to at least one of the rear and the front of the host vehicle.

* * * * *